United States Patent
Johnson et al.

(10) Patent No.: US 12,080,257 B1
(45) Date of Patent: Sep. 3, 2024

(54) RESPONSIVE DISPLAY

(71) Applicant: Toshiba Global Commerce Solutions, Inc., Durham, NC (US)

(72) Inventors: Brad M. Johnson, Raleigh, NC (US); Phil Brown, Apex, NC (US); James L. Frank, Montreal (CA)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/216,747

(22) Filed: Jun. 30, 2023

(51) Int. Cl.
G06F 3/041 (2006.01)
G06T 7/73 (2017.01)
G09G 5/32 (2006.01)

(52) U.S. Cl.
CPC .............. *G09G 5/32* (2013.01); *G06T 7/73* (2017.01); *G09G 2340/0464* (2013.01)

(58) Field of Classification Search
CPC ..... G09G 5/32; G09G 2340/0464; G06T 7/73
USPC .......................................................... 715/702
See application file for complete search history.

(56) References Cited

U.S. PATENT DOCUMENTS 8,519,971 B1 * 8/2013 Mackraz ............. G06F 3/04886
715/702
11,481,751 B1 * 10/2022 Chaubard ............... G06V 10/82

OTHER PUBLICATIONS projectorscreen.com, "How to Perfectly Align a Projector", Mar. 1, 2021, pp. 1-4, retrieved on May 31, 2023, retrieved from internet: https://www.projectorscreen.com/blog/how-to-perfectly-align-a-projector.
MDN Web Docs, "background-position", Feb. 21, 2023, pp. 1-5, retrieved on May 31, 2023 retrieved from internet: https://developer.mozilla.org/en-US/docs/Web/CSS/background-position.
Digital Ocean, "How to Scale and Crop images with CDD object-fit", Apr. 13, 2021, pp. 1-15, retrieved on May 31, 2023, retrieved from internet: https://www.digitalocean.com/community/tutorials/css-cropping-images-object-fit.
MDN Web Docs, "background-size", Feb. 21, 2023, pp. 1-5, retrieved on May 31, 2023, retrieved from internet: https://developer.mozilla.org/en-US/docs/Web/CSS/background-size.
Stack Overflow, "How to get div height to auto-adjust to background size?", pp. 1-16, retrieved on May 31, 2023, retrieved from internet: https://stackoverflow.com/questions/600743/how-to-get-div-height-to-auto-adjust-tobackground-size.

* cited by examiner

*Primary Examiner* — Abdul-Samad A Adediran
(74) *Attorney, Agent, or Firm* — COATS & BENNETT, PLLC

(57) ABSTRACT

The present disclosure provides improved methods for generating, by a computing device, graphical elements on a display. The computing device, comprising at least part of one or more graphical elements, identifies an obstructed portion of a display that is blocked by the object. The computing device identifies an unobstructed portion of the display that is not blocked by an object and arranges one or more graphical elements from the obstructed portion to the unobstructed portion of the display.

18 Claims, 12 Drawing Sheets

RESPONSIVE DISPLAY

BACKGROUND

Most non-mobile electronic displays, whether big or small, are mounted in place or held in a larger housing. These stationary displays are more prone to being blocked by other stationery or moving objects moving in front of the display.

BRIEF DESCRIPTION OF THE DRAWINGS

Aspects of the present disclosure are illustrated by way of example and are not limited by the accompanying Figures with like references indicating like elements.

DETAILED DESCRIPTION

Embodiments of the present disclosure generally improve upon traditional display technology by rearranging on-screen elements that are blocked from view to another on-screen location.

Often the images on the display are blocked by stationery or objects moving across the display screen. For example, a display housed within a self-checkout kiosk may be blocked by items placed on the scale of the kiosk. In this case, viewers may not be able to see all images generated on the display.

Conventional techniques for modifying the display to avoid blockage include setting the background image on a window or setting a projector to display above something. That is, previous techniques for modifying the display include rearranging the entire projected image or display. These solutions are not adequate for stationery or large displays. Unlike mounted displays with rotatable brackets or mobile devices, with stationary displays an obstructed viewpoint caused by items in front of the display is a fundamental problem that cannot be solved by repositioning the display.

The conventional techniques also do not dynamically adjust a display based to an environmental stimulus, for example, captured imagery, weight and or motion detection.

The solutions provided include a display that auto-adjusts an active display showing graphical elements in a responsive manner. The adjustments may be based on the location and other characteristics of an object blocking the display. The location and other characteristics may be sensed by one or more sensors and software technologies including, for example, computer vision, object detection, infrared lasers, scanners, and scales.

Figure 1A:
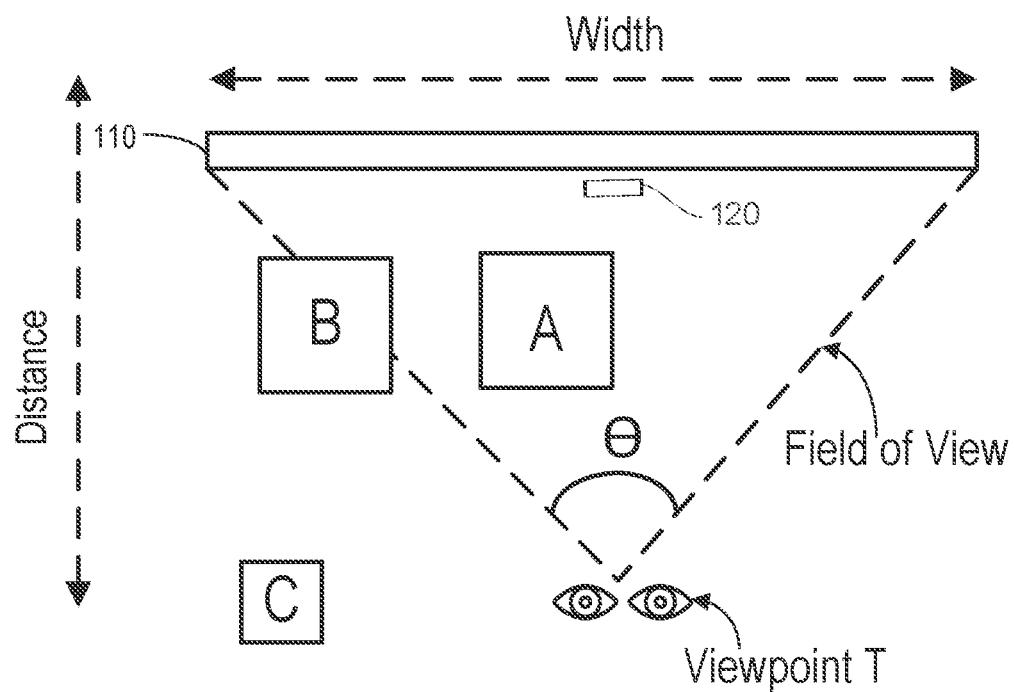
FIG. 1A is a schematic of a display including a field of view of viewpoint T with respect to the width of a display.

FIG. 1A illustrates a top view of display 110 with a field of view (FOV) relative to display 110. The FOV is determined by the location of a fixed point, i.e., viewpoint T. The FOV may refer to the coverage of an entire area rather than a single, fixed focal point. The FOV also describes the angle θ through which a person can see the visible world from viewpoint T. The display FOV may also refer to a range of angles where the image displayed on a monitor remains suitable to the user. The display FOV may be measured from the display's normal axis to each of four directions (i.e., up, right left and down). Viewpoint T is not limited to a single fixed point. More than one viewpoint positions may be used to determine more than one FOV's.

Figure 1B:
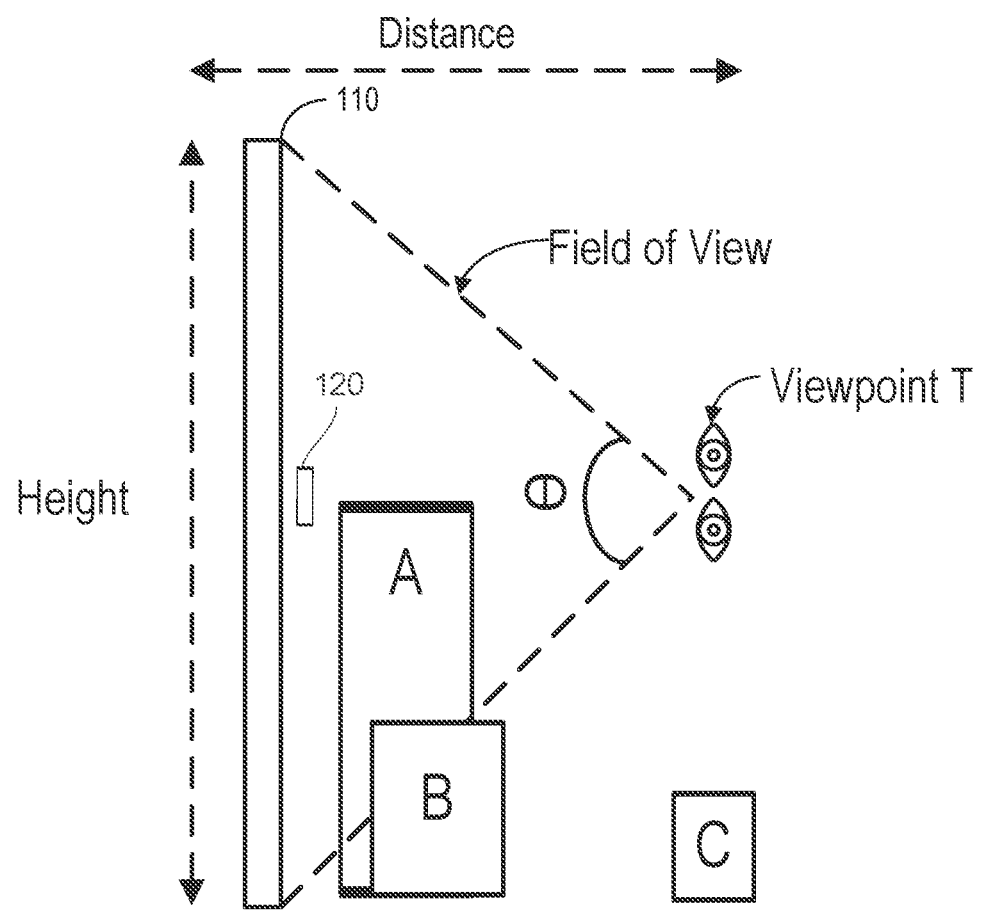
FIG. 1B is a schematic of a display including a field of view of viewpoint T with respect to the height of a display.

As shown in FIG. 1A, viewpoint T of display 110 is blocked by one or more objects A and B located within the FOV with respect to the width of the display 110. Object A blocks the target viewpoint T in the width direction. Object B is partially blocking viewpoint T. Both objects A and B are located on the left side of the display. While object C is behind viewpoint T and does not block the viewpoint T within the field of view. Of the same example, FIG. 1B illustrates side view of a display 110 with a FOV relative to the display 110 with respect to height. Objects A and B completely or partially block the viewpoint while object C does not block the viewpoint within the field of view. Objects A and B are located at the lower half of the display screen. Again, object C is behind viewpoint T. In this case, the display would be modified to move screen elements to the right-top side of the display to avoid objects A and B located on the left bottom side of the screen. Since object C does not block the viewpoint T and is not within the FOV, object C is not taken into consideration.

In both FIGS. 1A and 1B, the FOV and angle θ are determined by a predetermined location of viewpoint T. The position of viewpoint T may be determined according to the size and quality of the display and the maximum distance from the display to viewpoint T where the quality of the imagery from viewpoint T remains suitable to the user. For example, in a smaller display viewpoint T will have a shorter distance from the display as compared to a larger display.

Figure 2A:
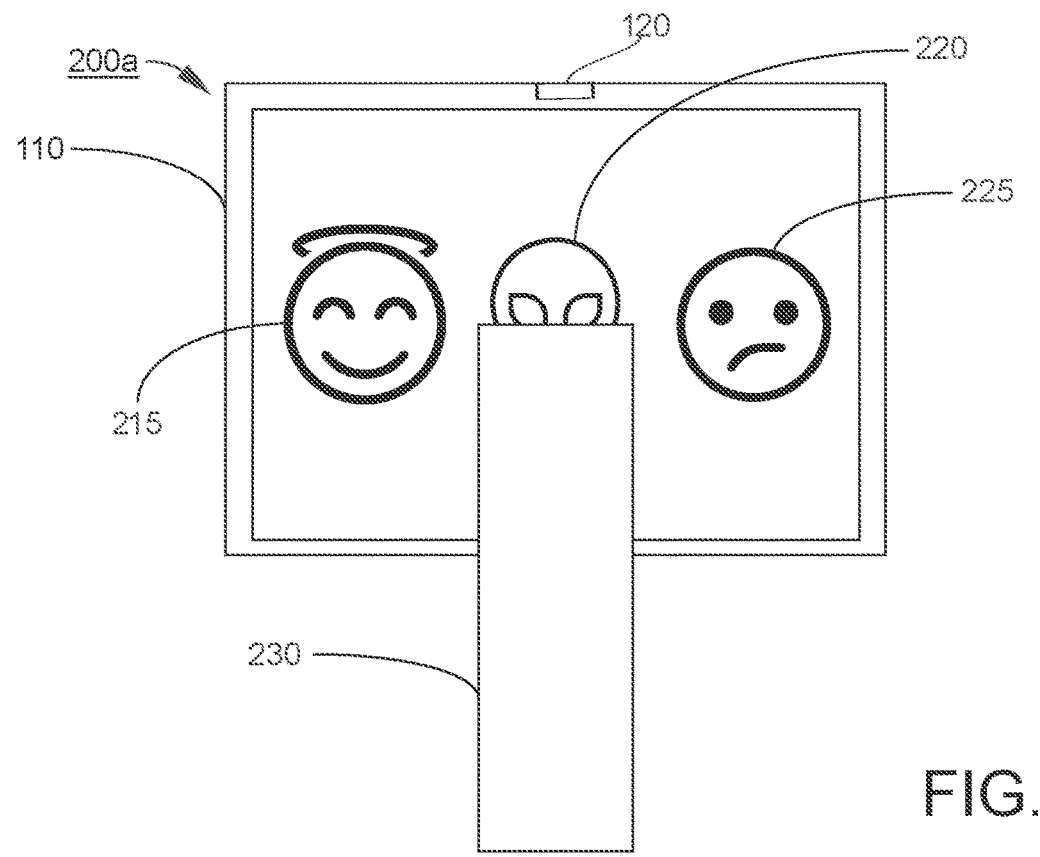
FIG. 2A is a schematic of a display including graphical elements obstructed by an object.

FIG. 2A is a schematic 200a of display 110 from a forward-looking perspective. In this example, display 110 includes graphical elements 215, 220 and 225. An object 230 centered in front of the screen is blocking graphical element 220. Object 230, for example, may be a person or item. One or more persons may not be able to see a portion of the display 110 behind the object 230.

Embodiments of the present disclosure provide a method of detecting that a view of a display 110 is partially blocked by an object and rearranging the one or more graphical elements from the blocked portion of the display into a non-blocked portion of the display.

Figure 2B:
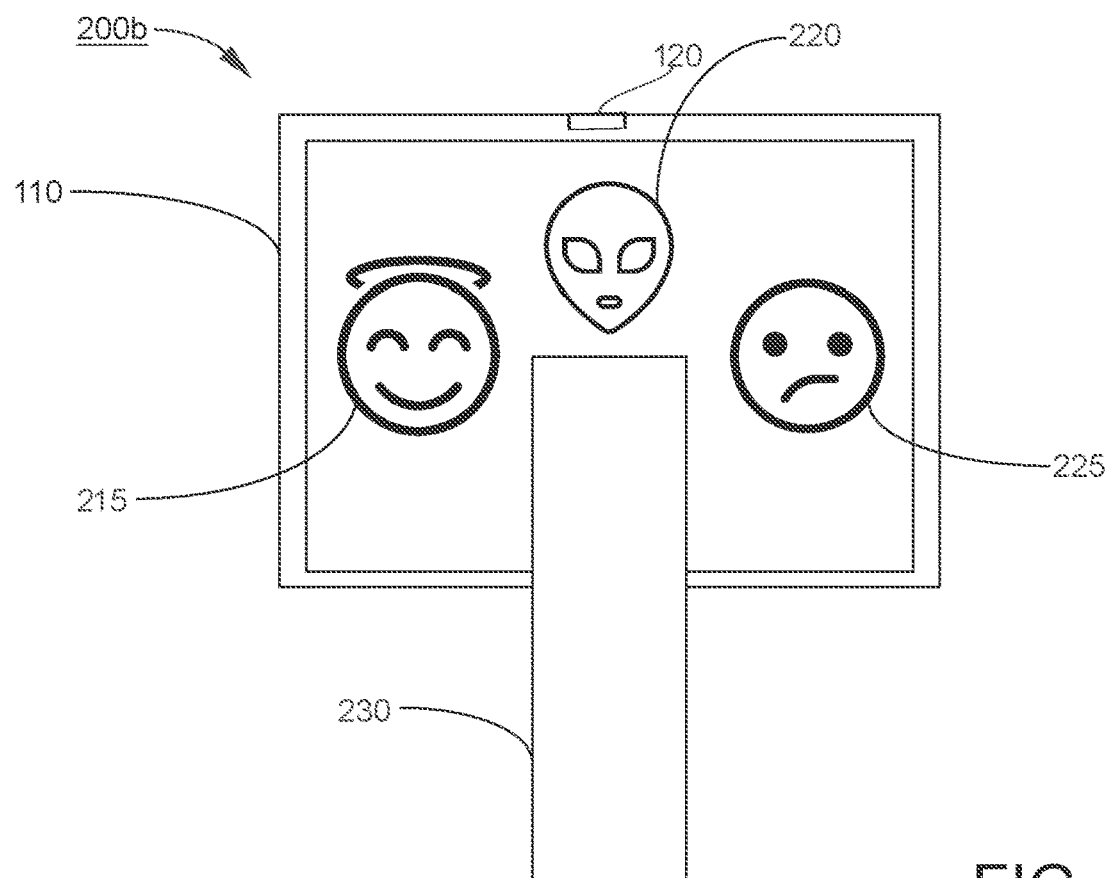
FIG. 2B is a schematic of a display with graphical elements relocated to an unobstructed portion of the display screen according to one or more embodiments of the present disclosure.

FIG. 2b illustrates a schematic 200b where the previously blocked graphical element 220 referenced in FIG. 2a is now unblocked. In this figure the unblocked graphical elements objects 215 and 225 remain in place while the graphical element 220 is moved into a unobstructed position above object 230.

In this example graphical elements 215, 220 and 225 are the same size. Because object 230 only blocks graphical element 220, the graphical element 220 can be rearranged into a new, unobstructed position without moving graphical elements 215 and 225.

The display devices disclosed herein may be coupled to or include any one or more sensors 120 including, for example, an image sensor, a weight sensor, and a scatter scanner. The sensors 120 may be used to detect, identify, and locate an object in front of the display.

In other examples, where the graphical elements do not fit in the unobstructed area the graphical elements may be resized to fit into the unobstructed display area without compromising the integrity of the imagery.

Figure 3A:
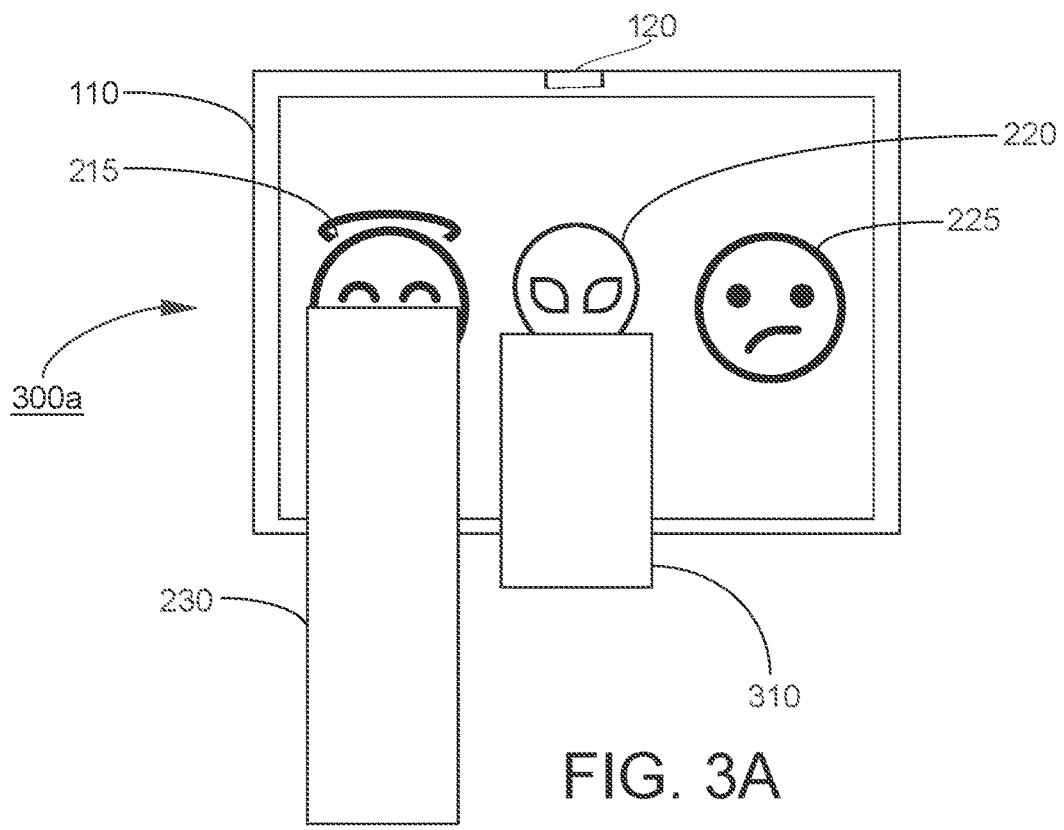
FIG. 3A is a schematic of a display including graphical elements obstructed by multiple objects.
Figure 3B:
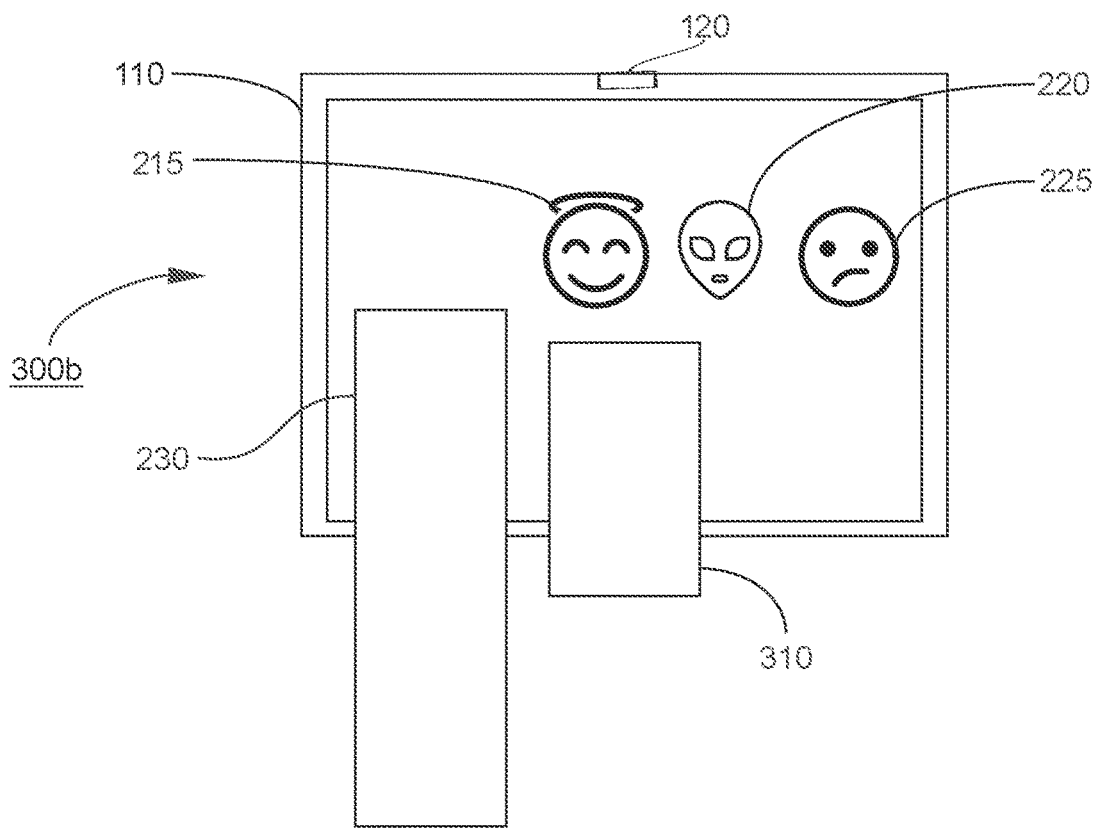
FIG. 3B is a schematic of a display with graphical elements relocated to an unobstructed portion of the display screen according to one or more embodiments of the present disclosure.

FIG. 3B is a schematic 300b of a display 110 adjusted responsive to objects 230 and 310 illustrated in schematic 300a of FIG. 3A being placed in front of display 110. In FIG. 3B, graphical elements 215, 220 and 225 are relocated to a non-blocked or unobstructed portion of the display screen. In this illustration, graphical elements 215, 220 and 225 are repositioned in unobstructed portions of the display. Since the unobstructed portion of the display is small the graphical objects 215, 220 and 225 are resized to fit into the smaller unobstructed display area.

Figure 4A:
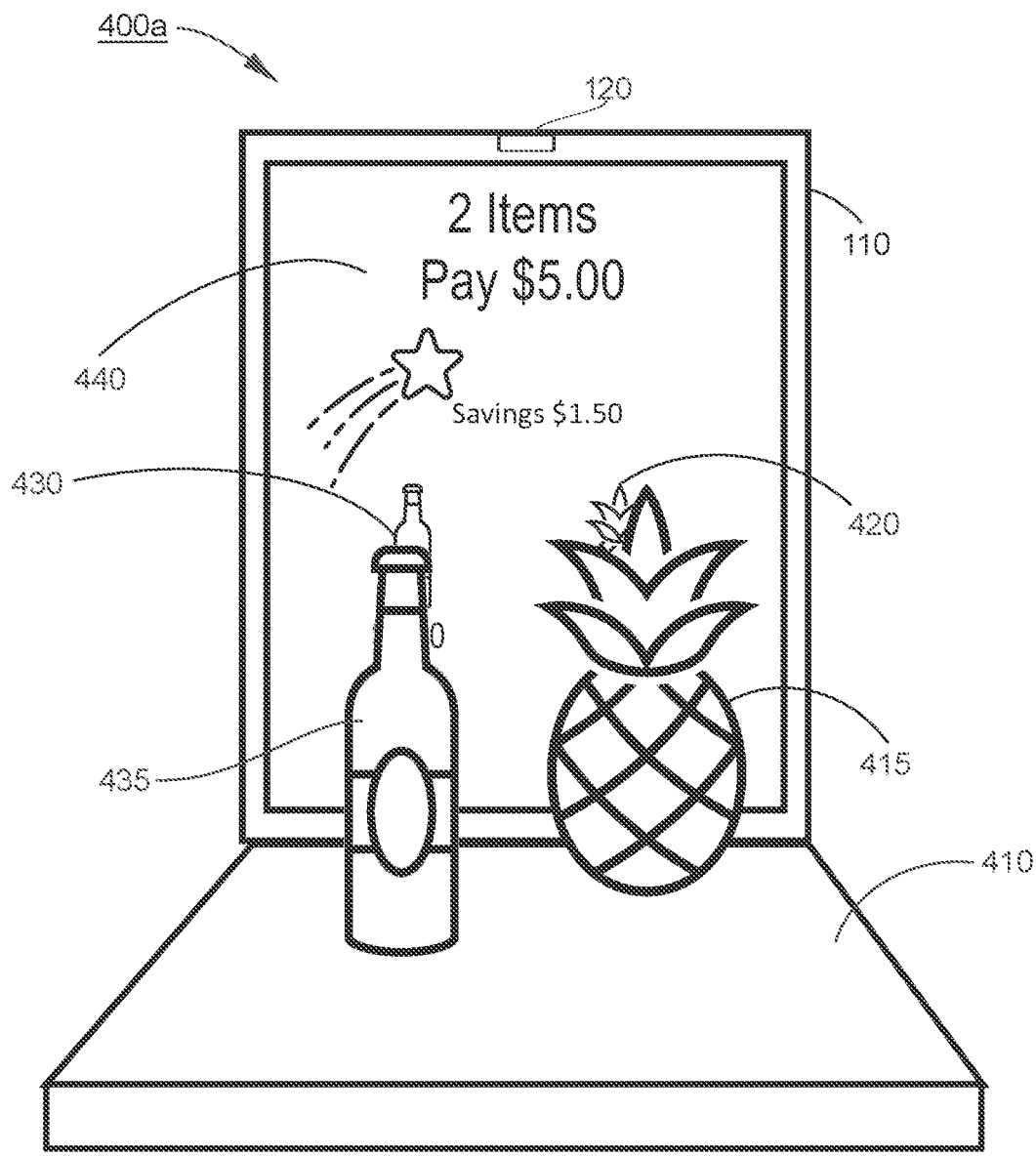
FIG. 4A is a schematic of a point-of-sale kiosk including a display with graphical elements obstructed by multiple objects.

FIG. 4A is a schematic of a point-of-sale kiosk 400a including a display 110 and platform 410. During a sales transaction, sale items 435, 415 are placed on the kiosk platform 410. As items are placed on platform 410 each object's identity is determined and shown on the display 110.

Computer vision based self-checkout kiosks utilizing displays as their backdrop, as shown in FIG. 4A, may have the view of graphical elements 430 and 420 blocked by items 435, 415 placed on platform 410. Moving the items to reach (or even see) the display can be problematic as items are required to be spaced apart on a size-limited scanning area.

Figure 4B:
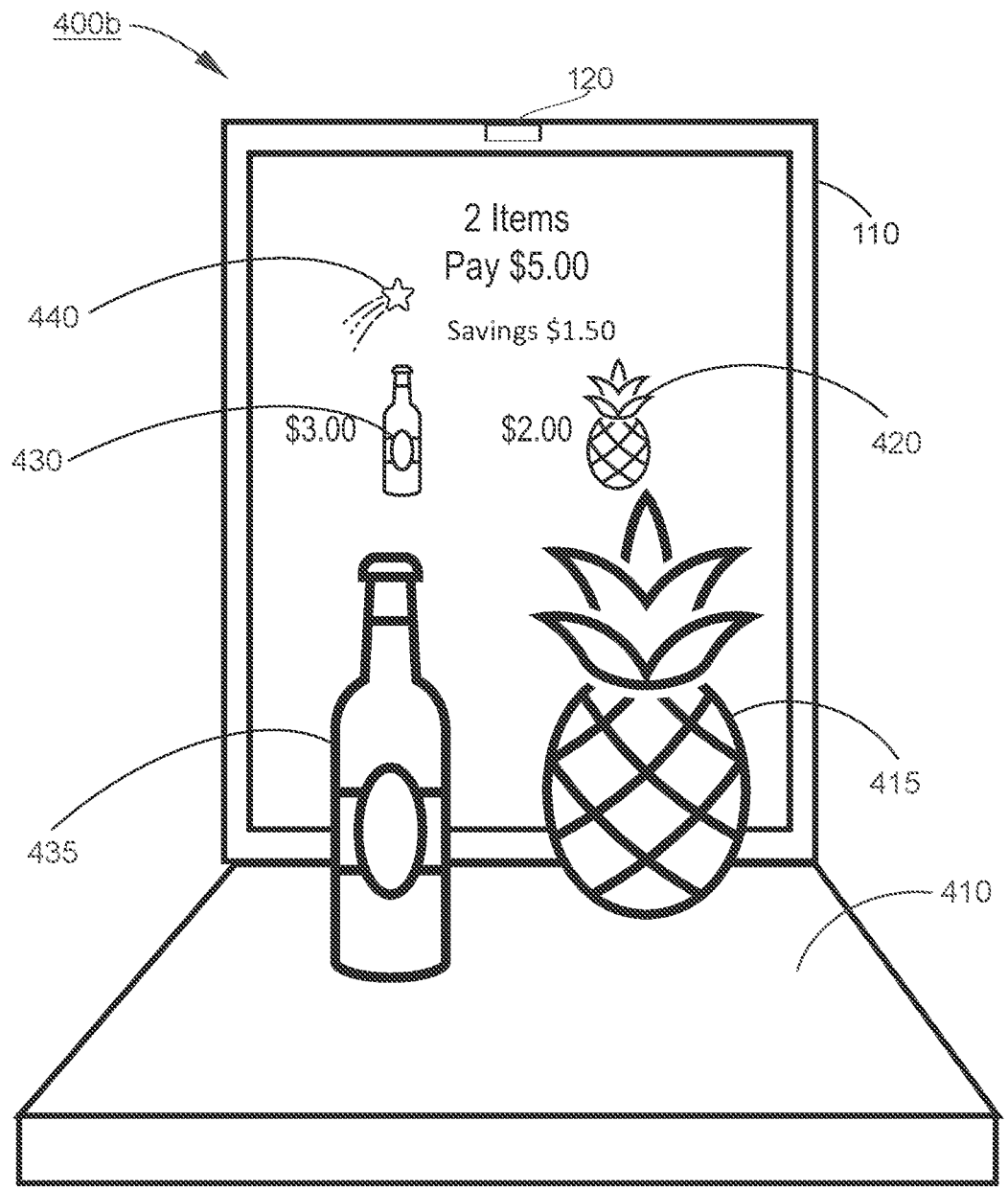
FIG. 4B is a schematic of a point-of-sale kiosk including a display with graphical elements relocated to an unobstructed portion of the display screen according to one or more embodiments of the present disclosure.

FIG. 4B illustrates a solution to the problem illustrated in FIG. 4A. In FIG. 4B the schematic 400b illustrates graphical elements 430 and 440 are relocated to an unobstructed area above objects 415 and 435.

A weight sensor placed at platform for 410 may be used to determine the weight, location, and size of each item. The obstructed and unobstructed areas may be determined using weight sensor data.

Billboard

In other embodiments, electronic signage such as billboards that show advertisements in retail locations or on streets, for example, at bus stops can be configured to implement the methods disclosed herein.

Figure 5A:
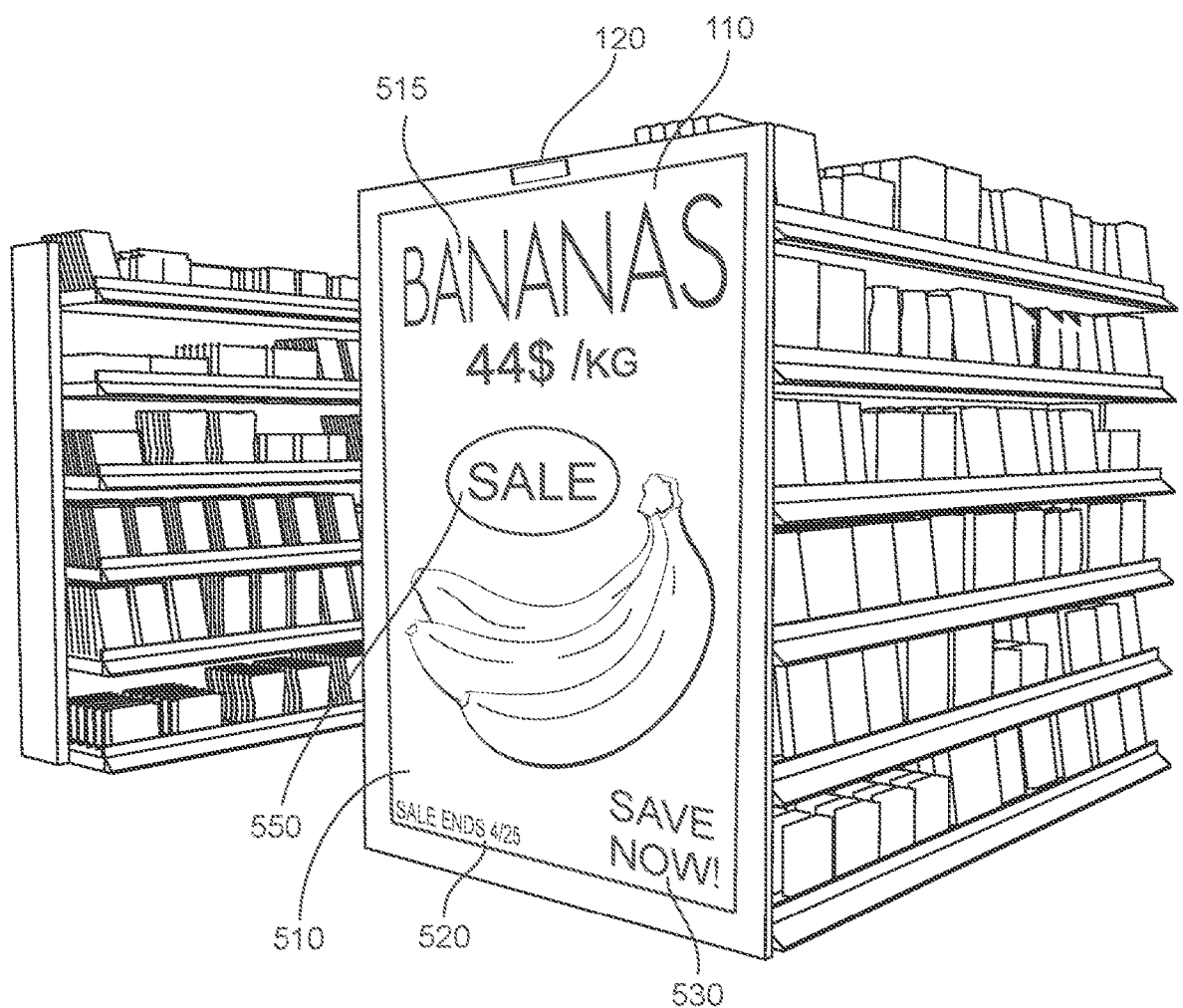
FIG. 5A is a schematic of an electronic billboard display with graphical elements obstructed by multiple objects.

FIG. 5A is a schematic of an electronic billboard display 110 with graphical elements 510, 515, 520, 530 and 550. In this example, the graphical elements 510, 515, 520, 530 and 550 may be placed across the entire display 110 because there are no objects blocking the display. For advertising purposes, additional props or sale items may be placed in front of the display. In this case, the area of the display may be reduced according to the size of the props placed in front of the display.

Figure 5B:
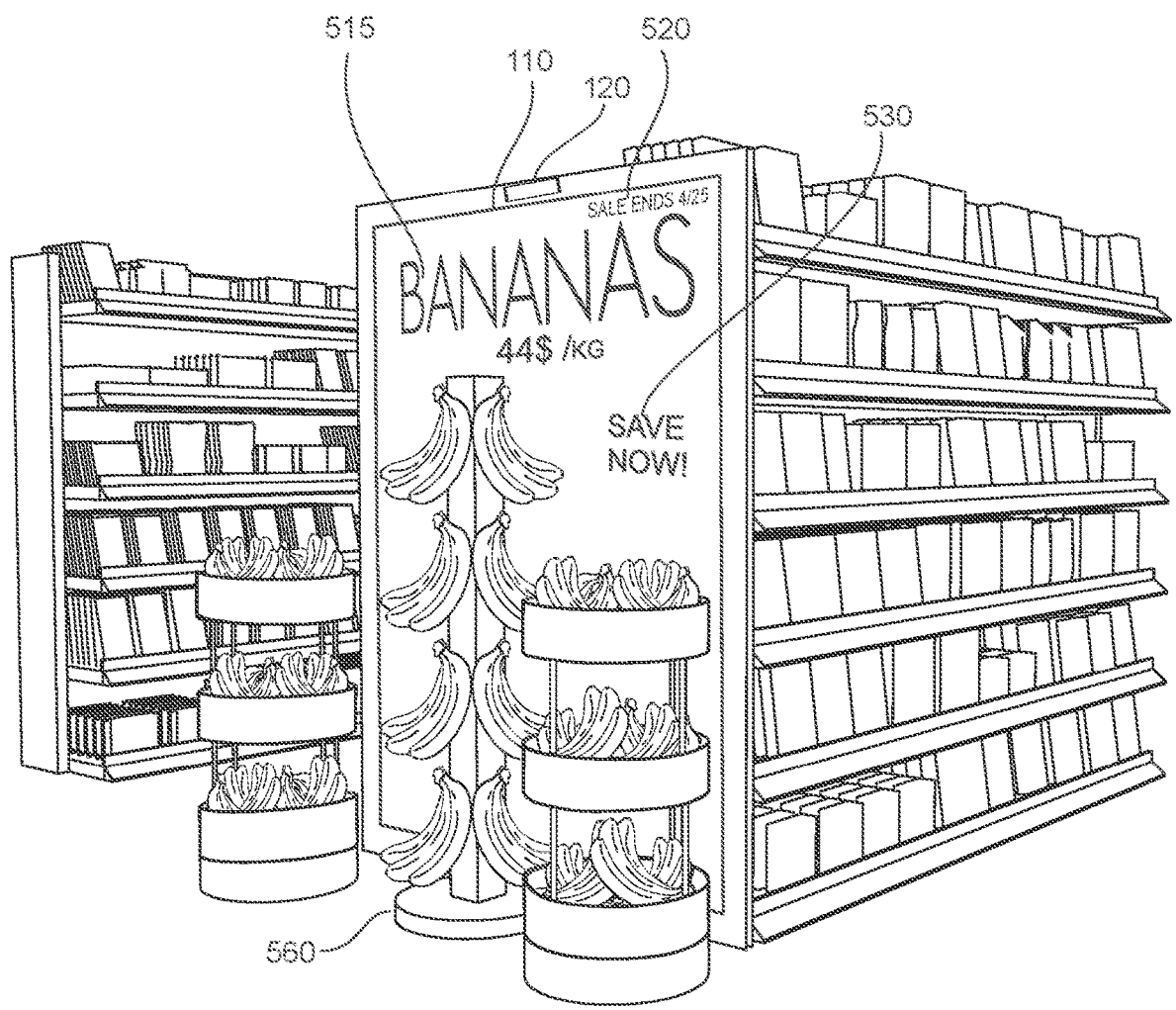
FIG. 5B is a schematic of an electronic billboard display with graphical elements relocated to an unobstructed portion of the display screen according to one or more embodiments of the present disclosure.

FIG. 5B is a schematic of an electronic billboard display with graphical elements 510, 515, 520, 530 and 550 relocated to an unobstructed portion of the display 110 according to the location of the props placed in front of the display. In this example, banana stands 560 are placed in front of the display. The graphical elements are now rearranged above the banana stands 560.

In some examples, graphical elements can be prioritized according to the importance of the graphical element 510, 515, 520, 530 and 550. For example, the word bananas 515 and the price of the bananas per pound may have a higher priority than the image of the banana and the sale text 550. When the unobstructed area is not large enough to include all graphical elements within the display the lower priority graphical elements may be left out or resized to a smaller size in order to fit into the display. The priority of the graphical elements may be decided by the creator of the digital advertisement.

Figure 6A:
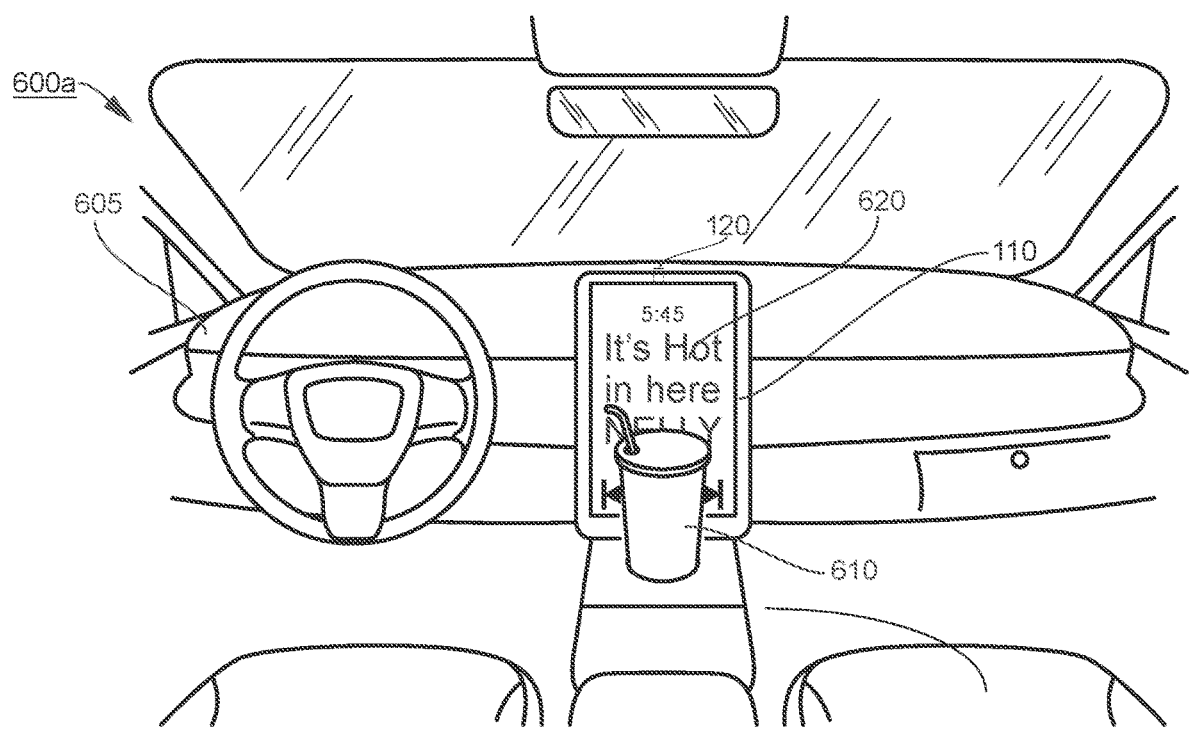
FIG. 6A is a schematic of a vehicle display with graphical elements obstructed by an object.
Figure 6B:
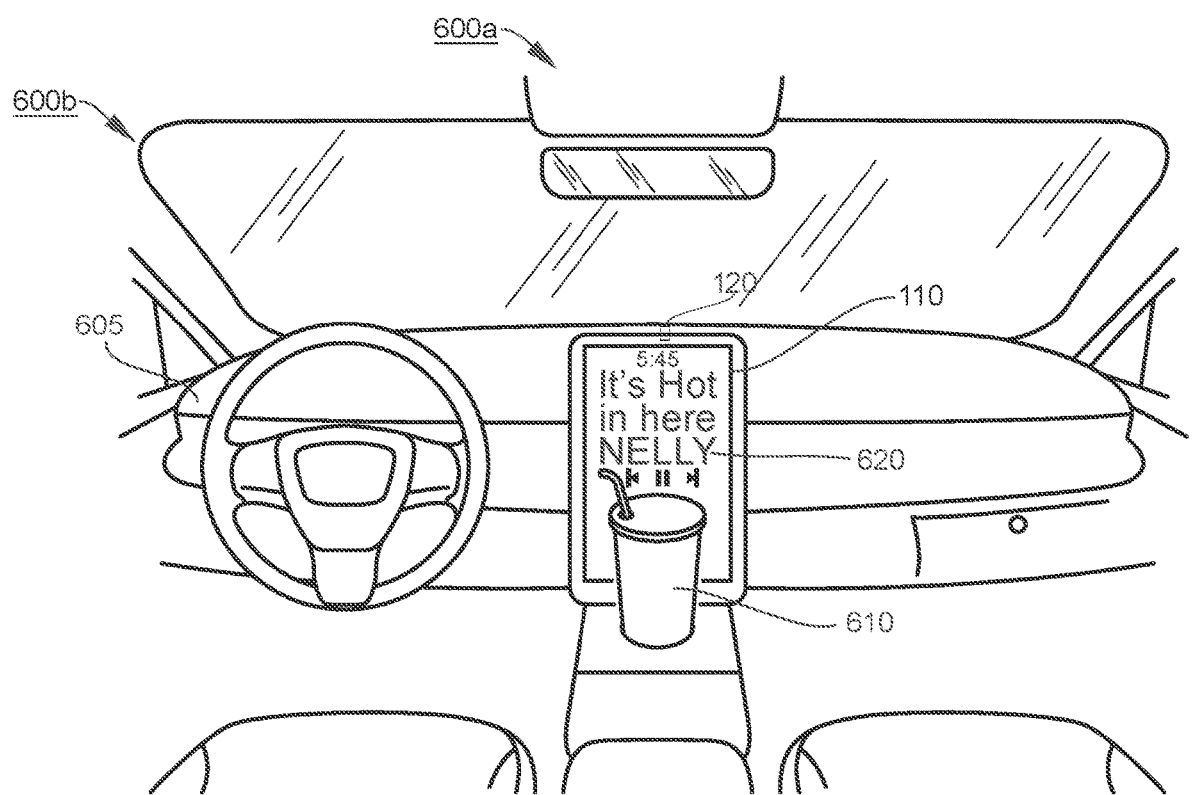
FIG. 6B is a schematic of a vehicle display with graphical elements relocated to an unobstructed portion of the display screen according to one or more embodiments of the present disclosure.

FIG. 6A is a schematic 600a of a vehicle 605 with display 110 located in the vehicle. The display includes graphical elements 620 obstructed by object 610. Object 610 is placed such that the view is partially blocked relative to the driver of the vehicle. Sensor 120 is able to detect the cup in the cup holder in front of the display. Sensor 120 may be a camera or scanner. Once detected, as illustrated in schematic 600b of FIG. 6B, the display elements 620 are relocated to the top of the screen in an area where the cup does not obstruct the view of the screen from the driver.

Figure 7:
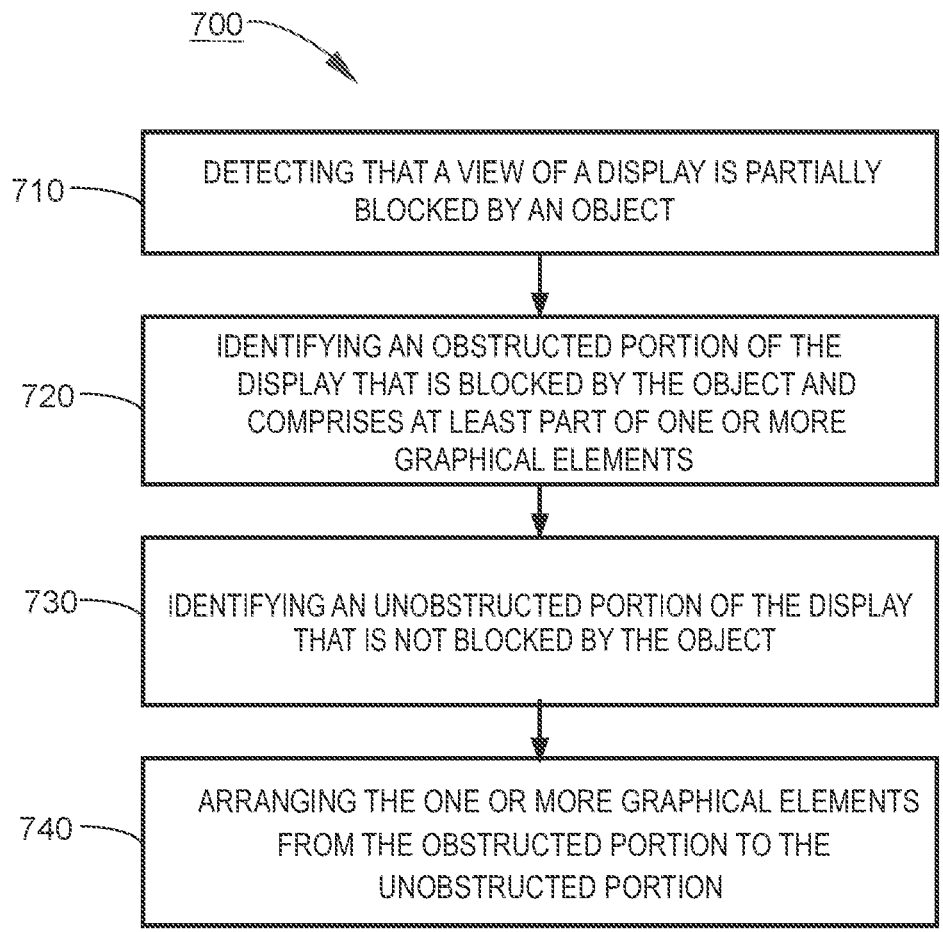
FIG. 7 is a flow diagram illustrating a method implemented by a computing device according to one or more embodiments of the present disclosure.

FIG. 7 is a flow diagram illustrating a method (700) performed by a computing device. The method (700) includes detecting (710) that a view of a display is partially blocked by an object. The display includes at least part of one or more graphical elements. The method further includes in response to identifying (720) an obstructed portion of the display that is blocked by the object, the computing device is configured to identify (730) an unobstructed portion of the display that is not blocked by the object. The method further includes arranging (740) the one or more graphical elements from the obstructed portion to the unobstructed portion.

According to some embodiments the computing device auto-adjusts graphical elements in a responsive manner, based on the size of the items placed on a scanning platter.

According to some embodiments the method includes determining that the obstructed portion includes the one or more graphical elements includes comparing a shape and position of the object to a shape and position of each of the graphical elements.

According to some embodiments the method includes identifying the obstructed and unobstructed portions includes identifying a shape of the object from an image captured by an image sensor.

According to some embodiments the method includes detecting that the view is partially blocked includes receiving an object detection indication from a weight sensor in front of the display.

According to some embodiments the computing device includes a point-of-sale terminal.

According to some embodiments the one or more graphical elements are comprised within a purchasing interface that is at least partially blocked relative to a user of the point-of-sale terminal that is attempting to purchase the object.

According to some embodiments the computing device includes an electronic billboard.

According to some embodiments the display is a smart mirror.

According to some embodiments the obstructed portion of the display includes an image of a person standing in front of the smart mirror.

According to some embodiments the computing device is capable of detecting that a view of a display is no longer blocked by the object. In response identifying, by the computing device, a previously obstructed portion of the display previously blocked by the object.

According to some embodiments the graphical element is rearranged to the previously obstructed portion. This may occur after the previously obstructed portion becomes unobstructed. This may occur, for example, if the object is moved out of the way of the display.

Figure 8:
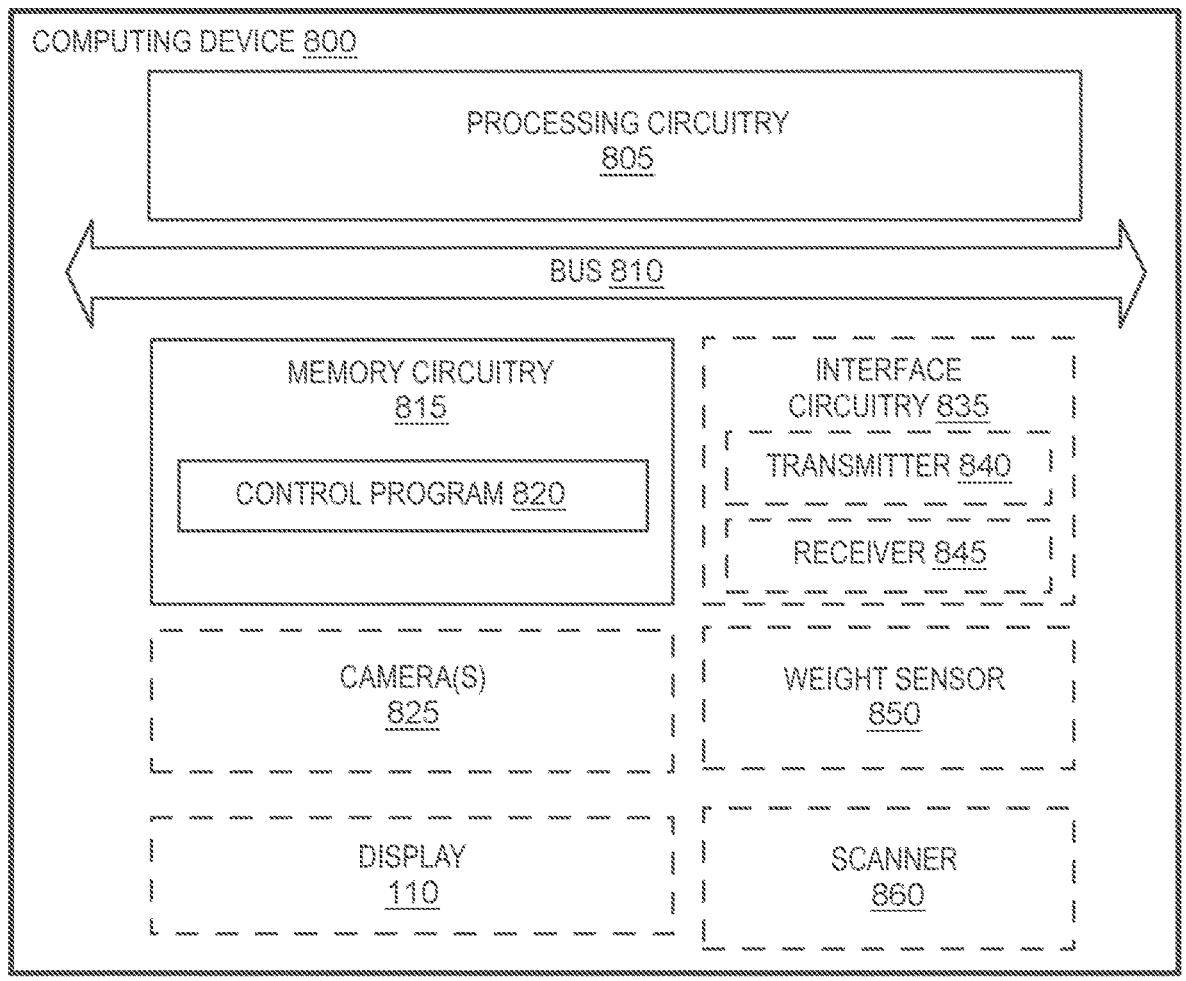
FIG. 8 is a schematic block diagram illustrating an exemplary computing device according to one or more embodiments of the present disclosure.

FIG. 8 is a schematic block diagram that illustrates an exemplary computing device 800 according to one or more embodiments of the present disclosure. The example computing device includes processing circuitry 805, memory circuitry 815, and interface circuitry 835. The processing circuitry 805 is communicatively coupled to the memory circuitry 815 and the interface circuitry 835, e.g., via one or more buses 810. The processing circuitry 805 may include one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 805 may be programmable hardware capable of executing software instructions 820 stored, e.g., as a machine-readable computer program in the memory circuitry 815. The memory circuitry 815 of the various embodiments may include any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 835 may be a controller hub configured to control the input and output (I/O) data paths of the computing device 800. Such I/O data paths may include data paths for exchanging signals over a communications network and data paths for exchanging signals with a user. For example, interface circuitry 835 may include a transceiver configured to send and receive communication signals over one or more of a cellular network, Ethernet network, or optical network. The interface circuitry 835 may also include (or be communicatively connected to) one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 835 may also include one or more of a pointing device (e.g., a mouse, stylus, touchpad, trackball, pointing stick, joystick), touchscreen, microphone for speech input, optical sensor for optical recognition of gestures, and keyboard for text entry. In some embodiments, the computing device 800 may additionally or alternatively include a combination of sensors 120 including one or more cameras 825, weight sensors 850, scanners 860, and one or more displays 110, I/O devices, illumination sources, and/or near-field receivers as discussed above, either as part of the interface circuitry 835 or communicatively connected thereto.

The interface circuitry 835 may be implemented as a unitary physical component, or as a plurality of physical components that are contiguously or separately arranged, any of which may be communicatively coupled to any other or may communicate with any other via the processing circuitry 805. For example, the interface circuitry 835 may include output circuitry (e.g., transmitter circuitry 840 configured to send communication signals over the communications network) and input circuitry (e.g., receiver circuitry 845 configured to receive communication signals over the communications network). Similarly, the output circuitry may include a display 110, whereas the input circuitry may include a keyboard, touch screen, or card reader. Other examples, permutations, and arrangements of the above and their equivalents will be readily apparent to those of ordinary skill.

Other embodiments include a non-transitory computer-readable medium (e.g., the memory circuitry 815) storing a computer program (e.g., control program 820) that includes software instructions that, when run on processing circuitry 805 of the computing device 800, causes the computing device 800 to perform any of the methods disclosed herein.

The present disclosure may, of course, be carried out in other ways than those set forth herein without departing from essential characteristics of the present disclosure. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various sequences and orders while still falling within the scope of the present disclosure.

The invention claimed is:

1. A method, comprising:
    detecting that a view of a display is partially blocked by an object, and in response:
        identifying an obstructed portion of the display that is blocked by the object and comprises at least part of one or more graphical elements;
        identifying an unobstructed portion of the display that is not blocked by the object; and
        arranging the one or more graphical elements from the obstructed portion to the unobstructed portion;
        wherein the display is comprised in an electronic billboard; and
        wherein the one or more graphical elements comprise a product being advertised, information identifying a seller of the product, or both the product being advertised and the information identifying the seller of the product.

2. The method of claim 1, wherein detecting that the view is partially blocked comprises receiving an object detection indication from a weight sensor in front of the display.

3. The method of claim 1, wherein identifying the obstructed and unobstructed portions comprises identifying a shape of the object from an image captured by an image sensor.

4. The method of claim 1, wherein determining that the obstructed portion comprises the one or more graphical elements comprises comparing a shape and position of the object to a shape and position of each of the graphical elements.

5. The method of claim 1, further comprising arranging the one or more graphical elements upon detecting a movement of the object into the obstructed portion.

6. The method of claim 1, further comprising detecting that a view of the display is no longer blocked by the object, and in response:
- identifying a previously obstructed portion of the display previously blocked by the object; and
- rearranging at least one of the graphical elements to the previously obstructed portion.

7. A computing device, comprising:
processing circuitry and memory comprising instructions executable by the processing circuitry whereby the computing device is configured to:
- detect that a view of a display is partially blocked by an object, and in response:
- identify an obstructed portion of the display that is blocked by the object and comprises at least part of one or more graphical elements;
- identify an unobstructed portion of the display that is not blocked by the object; and
- arrange the one or more graphical elements from the obstructed portion to the unobstructed portion;
- wherein the display is comprised in an electronic billboard; and
- wherein the one or more graphical elements comprise a product being advertised, information identifying a seller of the product, or both the product being advertised and the information identifying the seller of the product.

8. The computing device of claim 7, wherein detecting that the view is partially blocked comprises receiving an object detection indication from a weight sensor in front of the display.

9. The computing device of claim 7, wherein identifying the obstructed and unobstructed portions comprises identifying a shape of the object from an image captured by an image sensor.

10. The computing device of claim 7, wherein determining that the obstructed portion comprises the one or more graphical elements comprises comparing a shape and position of the object to a shape and position of each of the graphical elements.

11. The computing device of claim 7, further comprising arranging the one or more graphical elements upon detecting a movement of the object into the obstructed portion.

12. The computing device of claim 7, further comprising detecting that a view of the display is no longer blocked by the object, and in response:
- identifying a previously obstructed portion of the display previously blocked by the object; and
- rearranging at least one of the graphical elements to the previously obstructed portion.

13. A method, comprising:
detecting that a view of a display is partially blocked by an object, and in response:
- identifying an obstructed portion of the display that is blocked by the object and comprises at least part of one or more graphical elements;
- identifying an unobstructed portion of the display that is not blocked by the object; and
- arranging the one or more graphical elements from the obstructed portion to the unobstructed portion;
- wherein the display is comprised within a vehicle and the view is partially blocked relative to a driver of the vehicle.

14. The method of claim 13, wherein detecting that the view is partially blocked comprises receiving an object detection indication from a weight sensor in front of the display.

15. The method of claim 13, wherein identifying the obstructed and unobstructed portions comprises identifying a shape of the object from an image captured by an image sensor.

16. The method of claim 13, wherein determining that the obstructed portion comprises the one or more graphical elements comprises comparing a shape and position of the object to a shape and position of each of the graphical elements.

17. The method of claim 13, further comprising arranging the one or more graphical elements upon detecting a movement of the object into the obstructed portion.

18. The method of claim 13, further comprising detecting that a view of the display is no longer blocked by the object, and in response:
- identifying a previously obstructed portion of the display previously blocked by the object, and
- rearranging at least one of the graphical elements to the previously obstructed portion.

* * * * *